July 23, 1929.  C. C. JENSEN  1,721,561
CLAMP NAIL
Filed Dec. 8, 1926

Inventor
C. C. Jensen
By Lacey & Lacey, Attorneys

Patented July 23, 1929.

1,721,561

UNITED STATES PATENT OFFICE.

CARL C. JENSEN, OF CHICAGO, ILLINOIS, ASSIGNOR TO CLAMP NAIL COMPANY, OF CHICAGO, ILLINOIS, A CORPORATION OF ILLINOIS.

CLAMP NAIL.

Application filed December 8, 1926. Serial No. 153,403.

This invention relates to clamp nails and has for its object the provision of a clamp nail which may be very economically produced and which will be so constructed that it may be readily brought into proper position to engage the parts to be secured and may be fully driven home so as to effectually secure the parts. The invention is illustrated in the accompanying drawing and will be hereinafter fully described, the novel features being particularly pointed out in the appended claim.

Figure 1:
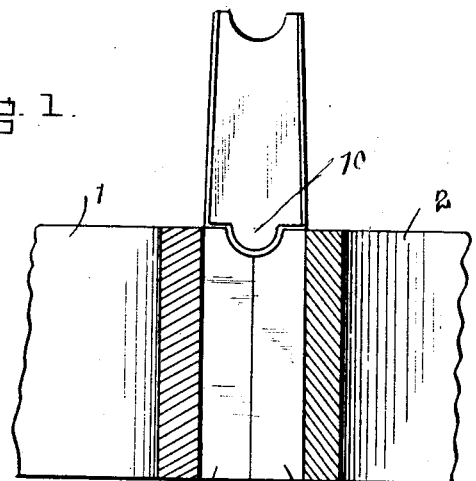
Figure 1 is an elevation of my improved clamp nail showing the same in position to be driven home.

Clamp nails are employed to secure the parts of a joint and are used more particularly in connecting the members of a miter joint. In the use of such devices, a kerf is formed in the opposed faces or ends of the members of the joint so that, when the joint members are brought together, the kerfs will aline, and the clamp nail which is constructed of thin metal, usually sheet metal, is engaged in the upper ends of the alined kerfs and then driven home, the nail being provided with lateral flanges at its side edges which have sharp longitudinal edges whereby they will cut into the walls of the kerf as the nail is driven through the kerfs. These flanges converge slightly from the driven end to the driving end of the nail so that, as the driving of the nail progresses, the members of the joint will be drawn together so as to form a tight joint without the use of glue or other substances which are objectionable owing to the difficulty of satisfactorily applying them and also because in the course of time they dry out and permit the joints to open. Considerable difficulty has been heretofore experienced in properly engaging the driven end of the nail with the upper ends of the kerfs, and the present invention provides a structure which will overcome this difficulty and at the same time will enable the rapid production of the nails in quantities. In the accompanying drawing, the members of a joint are indicated at 1 and 2, the said members being provided in their meeting ends or faces with kerfs 3 and 4, respectively. The clamp nail consists of a sheet metal plate or body 5 which is slightly wider at its driven end 6 than at its opposite driving end 7 and is provided with the side flanges 8 which extend through the entire length of the plate and are beveled so that their edges are sharp and will readily penetrate the wood of the joint members. According to the present invention, the plate or body 5 is provided with a semi-circular notch or recess 9 in its driving end with a square shoulder at each side of the notch to receive the impact of a driving tool and at its driven end is provided with a semi-circular tongue or projection 10. The nails are struck from a continuous blank strip and the tongue 10 is of the same diameter and dimensions as the recess 9 so that, when the shaping die is forced through the blank strip, the recess at one end of one nail will be produced simultaneously with and as the tongue at the meeting end of a succeeding nail is produced. The driven end of the nail, including the projecting tongue, is beveled, as indicated at 11, whereby it will be sharp enough to readily pass through the kerfs and remove any possible projections which may be left upon the walls of the kerfs as the latter are formed. The flanges 8 may be produced simultaneously with the formation of the tongue and the notches or may be produced by a separate step in the manufacturing process and as the flanges are produced sufficient pressure is applied to the blank to decrease the thickness of the plate or body from the driving to the driven end.

Figure 2:
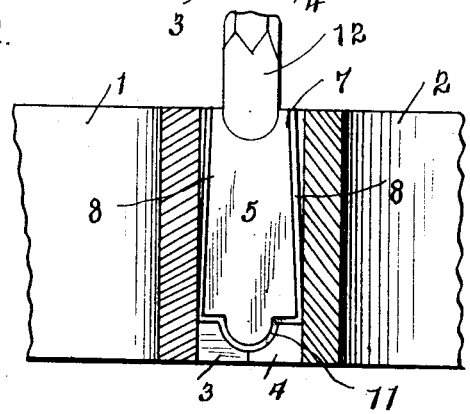
Fig. 2 is a similar view showing the nail driven home to secure the parts of a joint.
Figure 3:
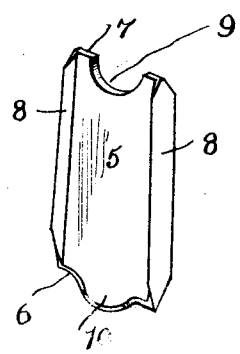
Fig. 3 is a detail perspective view of the improved clamp nail.

In applying a clamp nail embodying the present invention, the nail is disposed upright above the members of the joint, as indicated in Fig. 1, and the tongue 10 may be very easily engaged in the kerf, and when so engaged it will maintain the body of the nail in alinement with the kerfs and the kerfs in alinement with each other inasmuch as the opposite surfaces of the tongue will engage the opposite walls of the alined kerfs. The nail is then driven home in the usual manner of driving a nail and, as it progresses through the kerfs, the double flanges 8 will cut into the walls of the kerfs so that they will act as wedges to draw the joint members tightly together. The nail is driven home in this manner until the driving end thereof is flush or substantially flush with the upper surface of the joint and a setting tool 12 having a convex lower end is then engaged in the notch or recess 9, as shown in Fig. 2, so that the nail may then be firmly embedded in the joint with its upper end somewhat below the upper surface of the joint, the result being that there will be no portion of the nail left projecting above the joint members to detract from the appearance of the same or to provide an opportunity for the nail to be loosened through possible chance blows. When the nail has been driven home to such extent that its upper blunt end lies at the surface of the joint members and flush therewith, the notch in the driving end thereof will provide a positive seat for a nail set and the side walls of the kerfs bridging the notch will engage the projecting end of a nail set so that slipping of the latter will be prevented. The slight recess left in the surface of the joint over the driving end of the nail may be filled with any convenient material so that the joint may then be finished in any desired manner and may be completely hidden in the completed article.

It will be seen from the foregoing description, taken in connection with the accompanying drawing, that my present invention produces a nail which may be very easily engaged in the kerfs of the joint members by an unskilled person and may be driven home so as to effectually secure the joint and lend itself to a pleasing finish to the jointed article. The nails may be produced very rapidly and economically without any waste of the blank from which they are formed.

Having thus described the invention, I claim:

A clamp nail provided at its driven end with a central projecting tongue disposed entirely in the plane of the nail the tongue and the edge of the nail at the sides of the tongue being beveled and said edge portions of the nail being at a right angle to the medial longitudinal line of the nail, and the nail being provided at its opposite end with a central recess adapted to receive a setting tool and having its edge at opposite sides of the recess blunt and at a right angle to the medial longitudinal line of the nail to form shoulders for receiving impact of a driving tool.

In testimony whereof I affix my signature.

CARL C. JENSEN. [L. S.]